United States Patent
Chen et al.

(10) Patent No.: US 9,076,471 B1
(45) Date of Patent: Jul. 7, 2015

(54) FALL DETECTION SCHEME USING FFS (71) Applicant: Western Digital Technologies, Inc., Irvine, CA (US)

(72) Inventors: Min Chen, San Jose, CA (US); Sanghoon Chu, San Jose, CA (US); Jifang Tian, Fremont, CA (US); Zhongjie Li, San Jose, CA (US); Hien T. Chu, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/038,371

(22) Filed: Sep. 26, 2013

Related U.S. Application Data (60) Provisional application No. 61/860,858, filed on Jul. 31, 2013.

(51) Int. Cl.
G11B 5/02 (2006.01)
G11B 5/54 (2006.01)

(52) U.S. Cl.
CPC .................................. *G11B 5/54* (2013.01)

(58) Field of Classification Search
None
See application file for complete search history.

(56) References Cited

U.S. PATENT DOCUMENTS

| | | | |
|---|---|---|---|
| 5,546,806 A | 8/1996 | Kain | |
| 5,982,573 A * | 11/1999 | Henze | 360/75 |
| 6,014,283 A | 1/2000 | Codilian et al. | |
| 6,028,766 A * | 2/2000 | Strickler | 361/679.34 |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |

(Continued)

OTHER PUBLICATIONS

Michael T. Nicholls, et al., U.S. Appl. No. 14/033,048, filed Sep. 20, 2013, 23 pgs.

*Primary Examiner* — Peter Vincent Agustin (57) ABSTRACT

For a disk drive involving a disk; a head; and control circuitry having a servo control system operable to actuate the head, the control circuitry may be configured to determine a magnitude of acceleration readings, the acceleration readings involving at least three degrees of freedom, wherein when a magnitude of the acceleration readings is less than a first threshold, the control circuitry confirms a free fall, wherein when the magnitude is between the first and second threshold, the control circuitry confirms a tilt drop. During the tilt drop and the free fall, the control circuitry is further configured to actuate the head to park and monitor the shock impact.

18 Claims, 10 Drawing Sheets

(56) References Cited

U.S. PATENT DOCUMENTS

| | | | |
|---|---|---|---|
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,472,864 B1* | 10/2002 | Emo et al. | 324/207.16 |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,768,066 B2 | 7/2004 | Wehrenberg | |
| 6,771,449 B1* | 8/2004 | Ito et al. | 360/75 |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,098 B1 | 5/2006 | Yu et al. | |
| 7,059,182 B1 | 6/2006 | Ragner | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,071,597 B2 | 7/2006 | Lee et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,161,758 B2 | 1/2007 | Adapathya et al. | |
| 7,180,703 B1 | 2/2007 | Subrahmanyam et al. | |
| 7,184,230 B1 | 2/2007 | Chue et al. | |
| 7,191,089 B2 | 3/2007 | Clifford et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,281,522 B1 | 10/2007 | Sato et al. | |
| 7,289,288 B1 | 10/2007 | Tu | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,307,228 B2 | 12/2007 | Wehrenberg | |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,356,437 B2* | 4/2008 | Kobayashi et al. | 702/127 |
| 7,365,932 B1 | 4/2008 | Bennett | |
| 7,369,345 B1* | 5/2008 | Li et al. | 360/75 |
| 7,382,576 B2 | 6/2008 | Okada et al. | |
| 7,388,728 B1 | 6/2008 | Chen et al. | |
| 7,391,583 B1 | 6/2008 | Sheh et al. | |
| 7,391,584 B1 | 6/2008 | Sheh et al. | |
| 7,395,709 B2* | 7/2008 | Noda et al. | 73/510 |
| 7,397,626 B2 | 7/2008 | Aoki et al. | |

(56) References Cited

U.S. PATENT DOCUMENTS

| | | | |
|---|---|---|---|
| 7,428,119 B2* | 9/2008 | Kuroki et al. | 360/75 |
| 7,433,143 B1 | 10/2008 | Ying et al. | |
| 7,440,210 B1 | 10/2008 | Lee | |
| 7,440,225 B1 | 10/2008 | Chen et al. | |
| 7,450,332 B2* | 11/2008 | Pasolini et al. | 360/75 |
| 7,450,334 B1 | 11/2008 | Wang et al. | |
| 7,450,336 B1 | 11/2008 | Wang et al. | |
| 7,453,661 B1 | 11/2008 | Jang et al. | |
| 7,457,071 B1 | 11/2008 | Sheh | |
| 7,466,509 B1 | 12/2008 | Chen et al. | |
| 7,468,855 B1 | 12/2008 | Weerasooriya et al. | |
| 7,477,469 B2* | 1/2009 | Cook et al. | 360/75 |
| 7,477,471 B1 | 1/2009 | Nemshick et al. | |
| 7,480,116 B1 | 1/2009 | Bennett | |
| 7,489,464 B1 | 2/2009 | McNab et al. | |
| 7,492,546 B1 | 2/2009 | Miyamura | |
| 7,495,857 B1 | 2/2009 | Bennett | |
| 7,499,232 B2 | 3/2009 | Hodge et al. | |
| 7,499,236 B1 | 3/2009 | Lee et al. | |
| 7,502,192 B1 | 3/2009 | Wang et al. | |
| 7,502,195 B1 | 3/2009 | Wu et al. | |
| 7,502,197 B1 | 3/2009 | Chue | |
| 7,505,223 B1 | 3/2009 | McCornack | |
| 7,525,750 B2 | 4/2009 | Aoki et al. | |
| 7,525,751 B2 | 4/2009 | Han et al. | |
| 7,541,551 B2 | 6/2009 | Wehrenberg | |
| 7,542,225 B1 | 6/2009 | Ding et al. | |
| 7,548,392 B1 | 6/2009 | Desai et al. | |
| 7,551,388 B2* | 6/2009 | Horiguchi et al. | 360/75 |
| 7,551,389 B2* | 6/2009 | Tsuda et al. | 360/75 |
| 7,551,390 B1 | 6/2009 | Wang et al. | |
| 7,558,016 B1 | 7/2009 | Le et al. | |
| 7,573,670 B1 | 8/2009 | Ryan et al. | |
| 7,576,941 B1 | 8/2009 | Chen et al. | |
| 7,580,212 B1 | 8/2009 | Li et al. | |
| 7,583,470 B1 | 9/2009 | Chen et al. | |
| 7,595,954 B1 | 9/2009 | Chen et al. | |
| 7,602,575 B1 | 10/2009 | Lifchits et al. | |
| 7,616,399 B1 | 11/2009 | Chen et al. | |
| 7,619,844 B1 | 11/2009 | Bennett | |
| 7,626,782 B1 | 12/2009 | Yu et al. | |
| 7,630,162 B2 | 12/2009 | Zhao et al. | |
| 7,636,605 B2* | 12/2009 | Takakura | 700/45 |
| 7,639,447 B1 | 12/2009 | Yu et al. | |
| 7,656,604 B1 | 2/2010 | Liang et al. | |
| 7,656,607 B1 | 2/2010 | Bennett | |
| 7,660,067 B1 | 2/2010 | Ji et al. | |
| 7,663,833 B2 | 2/2010 | Aoki et al. | |
| 7,663,835 B1 | 2/2010 | Yu et al. | |
| 7,667,743 B2 | 2/2010 | Uchida et al. | |
| 7,675,707 B1 | 3/2010 | Liu et al. | |
| 7,679,854 B1 | 3/2010 | Narayana et al. | |
| 7,688,534 B1 | 3/2010 | McCornack | |
| 7,688,538 B1 | 3/2010 | Chen et al. | |
| 7,688,539 B1 | 3/2010 | Bryant et al. | |
| 7,690,253 B2* | 4/2010 | Noda et al. | 73/510 |
| 7,697,233 B1 | 4/2010 | Bennett et al. | |
| 7,701,661 B1 | 4/2010 | Bennett | |
| 7,706,097 B2 | 4/2010 | Kuroki et al. | |
| 7,710,676 B1 | 5/2010 | Chue | |
| 7,715,138 B1 | 5/2010 | Kupferman | |
| 7,729,079 B1 | 6/2010 | Huber | |
| 7,733,189 B1 | 6/2010 | Bennett | |
| 7,746,592 B1 | 6/2010 | Liang et al. | |
| 7,746,594 B1 | 6/2010 | Guo et al. | |
| 7,746,595 B1 | 6/2010 | Guo et al. | |
| 7,747,818 B1 | 6/2010 | Overby | |
| 7,751,142 B2 | 7/2010 | Karakas | |
| 7,752,351 B1 | 7/2010 | Overby | |
| 7,760,461 B1 | 7/2010 | Bennett | |
| 7,782,563 B2 | 8/2010 | Han et al. | |
| 7,800,853 B1 | 9/2010 | Guo et al. | |
| 7,800,856 B1 | 9/2010 | Bennett et al. | |
| 7,800,857 B1 | 9/2010 | Calaway et al. | |
| 7,802,476 B2 | 9/2010 | Lasalandra et al. | |
| 7,839,591 B1 | 11/2010 | Weerasooriya et al. | |
| 7,839,595 B1 | 11/2010 | Chue et al. | |
| 7,839,600 B1 | 11/2010 | Babinski et al. | |
| 7,843,662 B1 | 11/2010 | Weerasooriya et al. | |
| 7,852,588 B1 | 12/2010 | Ferris et al. | |
| 7,852,592 B1 | 12/2010 | Liang et al. | |
| 7,864,481 B1 | 1/2011 | Kon et al. | |
| 7,864,482 B1 | 1/2011 | Babinski et al. | |
| 7,865,253 B2 | 1/2011 | Harrington | |
| 7,869,155 B1 | 1/2011 | Wong | |
| 7,876,522 B1 | 1/2011 | Calaway et al. | |
| 7,876,523 B1 | 1/2011 | Panyavoravaj et al. | |
| 7,916,415 B1 | 3/2011 | Chue | |
| 7,916,416 B1 | 3/2011 | Guo et al. | |
| 7,916,420 B1 | 3/2011 | McFadyen et al. | |
| 7,916,422 B1 | 3/2011 | Guo et al. | |
| 7,929,238 B1 | 4/2011 | Vasquez | |
| 7,961,422 B1 | 6/2011 | Chen et al. | |
| 8,000,053 B1 | 8/2011 | Anderson | |
| 8,031,423 B1 | 10/2011 | Tsai et al. | |
| 8,054,022 B1 | 11/2011 | Ryan et al. | |
| 8,059,357 B1 | 11/2011 | Knigge et al. | |
| 8,059,360 B1 | 11/2011 | Melkote et al. | |
| 8,072,703 B1 | 12/2011 | Calaway et al. | |
| 8,077,428 B1 | 12/2011 | Chen et al. | |
| 8,078,901 B1 | 12/2011 | Meyer et al. | |
| 8,081,395 B1 | 12/2011 | Ferris | |
| 8,085,020 B1 | 12/2011 | Bennett | |
| 8,116,023 B1 | 2/2012 | Kupferman | |
| 8,145,934 B1 | 3/2012 | Ferris et al. | |
| 8,164,847 B2* | 4/2012 | Shibata | 360/75 |
| 8,179,626 B1 | 5/2012 | Ryan et al. | |
| 8,189,286 B1 | 5/2012 | Chen et al. | |
| 8,213,106 B1 | 7/2012 | Guo et al. | |
| 8,245,573 B2 | 8/2012 | Lammel | |
| 8,254,222 B1 | 8/2012 | Tang | |
| 8,300,348 B1 | 10/2012 | Liu et al. | |
| 8,315,005 B1 | 11/2012 | Zou et al. | |
| 8,320,069 B1 | 11/2012 | Knigge et al. | |
| 8,345,025 B2 | 1/2013 | Seibert et al. | |
| 8,351,174 B1 | 1/2013 | Gardner et al. | |
| 8,358,114 B1 | 1/2013 | Ferris et al. | |
| 8,358,145 B1 | 1/2013 | Ferris et al. | |
| 8,363,344 B2 | 1/2013 | Lin et al. | |
| 8,390,367 B1 | 3/2013 | Bennett | |
| 8,408,041 B2 | 4/2013 | Ten Kate et al. | |
| 8,432,031 B1 | 4/2013 | Agness et al. | |
| 8,432,629 B1 | 4/2013 | Rigney et al. | |
| 8,451,697 B1 | 5/2013 | Rigney et al. | |
| 8,482,873 B1 | 7/2013 | Chue et al. | |
| 8,498,076 B1 | 7/2013 | Sheh et al. | |
| 8,498,172 B1 | 7/2013 | Patton, III et al. | |
| 8,508,881 B1 | 8/2013 | Babinski et al. | |
| 8,531,798 B1 | 9/2013 | Xi et al. | |
| 8,537,486 B2 | 9/2013 | Liang et al. | |
| 8,542,455 B2 | 9/2013 | Huang et al. | |
| 8,553,351 B1 | 10/2013 | Narayana et al. | |
| 8,564,899 B2 | 10/2013 | Lou et al. | |
| 8,576,506 B1 | 11/2013 | Wang et al. | |
| 8,605,382 B1 | 12/2013 | Mallary et al. | |
| 8,605,384 B1 | 12/2013 | Liu et al. | |
| 8,610,391 B1 | 12/2013 | Yang et al. | |
| 8,611,040 B1 | 12/2013 | Xi et al. | |
| 8,619,385 B1 | 12/2013 | Guo et al. | |
| 8,630,054 B2 | 1/2014 | Bennett et al. | |
| 8,630,059 B1 | 1/2014 | Chen et al. | |
| 8,634,154 B1 | 1/2014 | Rigney et al. | |
| 8,634,283 B1 | 1/2014 | Rigney et al. | |
| 8,643,976 B1 | 2/2014 | Wang et al. | |
| 8,649,121 B1 | 2/2014 | Smith et al. | |
| 8,654,466 B1 | 2/2014 | McFadyen | |
| 8,654,467 B1 | 2/2014 | Wong et al. | |
| 8,665,546 B1 | 3/2014 | Zhao et al. | |
| 8,665,551 B1 | 3/2014 | Rigney et al. | |
| 8,670,206 B1 | 3/2014 | Liang et al. | |
| 8,687,312 B1 | 4/2014 | Liang | |
| 8,693,123 B1 | 4/2014 | Guo et al. | |
| 8,693,134 B1 | 4/2014 | Xi et al. | |
| 8,699,173 B1 | 4/2014 | Kang et al. | |

(56) References Cited

U.S. PATENT DOCUMENTS

| | | |
|---|---|---|
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,885,285 B1 | 11/2014 | Nicholls et al. |
| 8,953,274 B1 | 2/2015 | Ryan |
| 2003/0067705 A1* | 4/2003 | Ishiyama et al. ............... 360/75 |
| 2004/0240102 A1* | 12/2004 | Atsumi et al. ............ 360/78.06 |
| 2005/0088773 A1* | 4/2005 | Yoshida ......................... 360/75 |
| 2005/0207057 A1* | 9/2005 | Atsumi ..................... 360/78.09 |
| 2005/0213242 A1 | 9/2005 | Fujiki et al. |
| 2006/0070439 A1 | 4/2006 | Kwon et al. |
| 2006/0215299 A1* | 9/2006 | Kao et al. ........................ 360/69 |
| 2006/0268447 A1* | 11/2006 | Liao et al. ...................... 360/75 |
| 2007/0030587 A1* | 2/2007 | Noda et al. .................... 360/75 |
| 2007/0086108 A1* | 4/2007 | Kuroki et al. ................. 360/75 |
| 2007/0206316 A1* | 9/2007 | Takaishi .................... 360/77.02 |
| 2007/0223123 A1 | 9/2007 | Karakas |
| 2007/0253093 A1* | 11/2007 | Cook et al. ..................... 360/75 |
| 2008/0137227 A1* | 6/2008 | Tsuda et al. ............... 360/78.04 |
| 2008/0291576 A1* | 11/2008 | Aoki et al. ................... 360/254 |
| 2009/0021858 A1* | 1/2009 | Fu et al. .................... 360/99.01 |
| 2009/0031803 A1* | 2/2009 | Noda et al. ..................... 73/488 |
| 2010/0035085 A1 | 2/2010 | Jung et al. |
| 2010/0073812 A1* | 3/2010 | Shibata ..................... 360/97.02 |
| 2010/0172052 A1* | 7/2010 | Shibata ..................... 360/97.02 |
| 2010/0220581 A1* | 9/2010 | Nakamura et al. ......... 369/263.1 |
| 2011/0215940 A1 | 9/2011 | Bartholomeyczik et al. |
| 2012/0284493 A1 | 11/2012 | Lou et al. |
| 2012/0324980 A1 | 12/2012 | Nguyen et al. |
| 2013/0054180 A1 | 2/2013 | Barfield |
| 2013/0107394 A1 | 5/2013 | Lin et al. |
| 2013/0120147 A1 | 5/2013 | Narasimhan et al. |
| 2013/0120870 A1 | 5/2013 | Zhou et al. |
| 2013/0148240 A1 | 6/2013 | Ferris et al. |

* cited by examiner

FALL DETECTION SCHEME USING FFS

CROSS REFERENCE TO RELATED APPLICATION(S)

This application claims priority to provisional U.S. Patent Application Ser. No. 61/860,858, filed on Jul. 31, 2013, which is hereby incorporated by reference in its entirety.

BACKGROUND

Disk drives comprise a disk media and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

Figure 1:
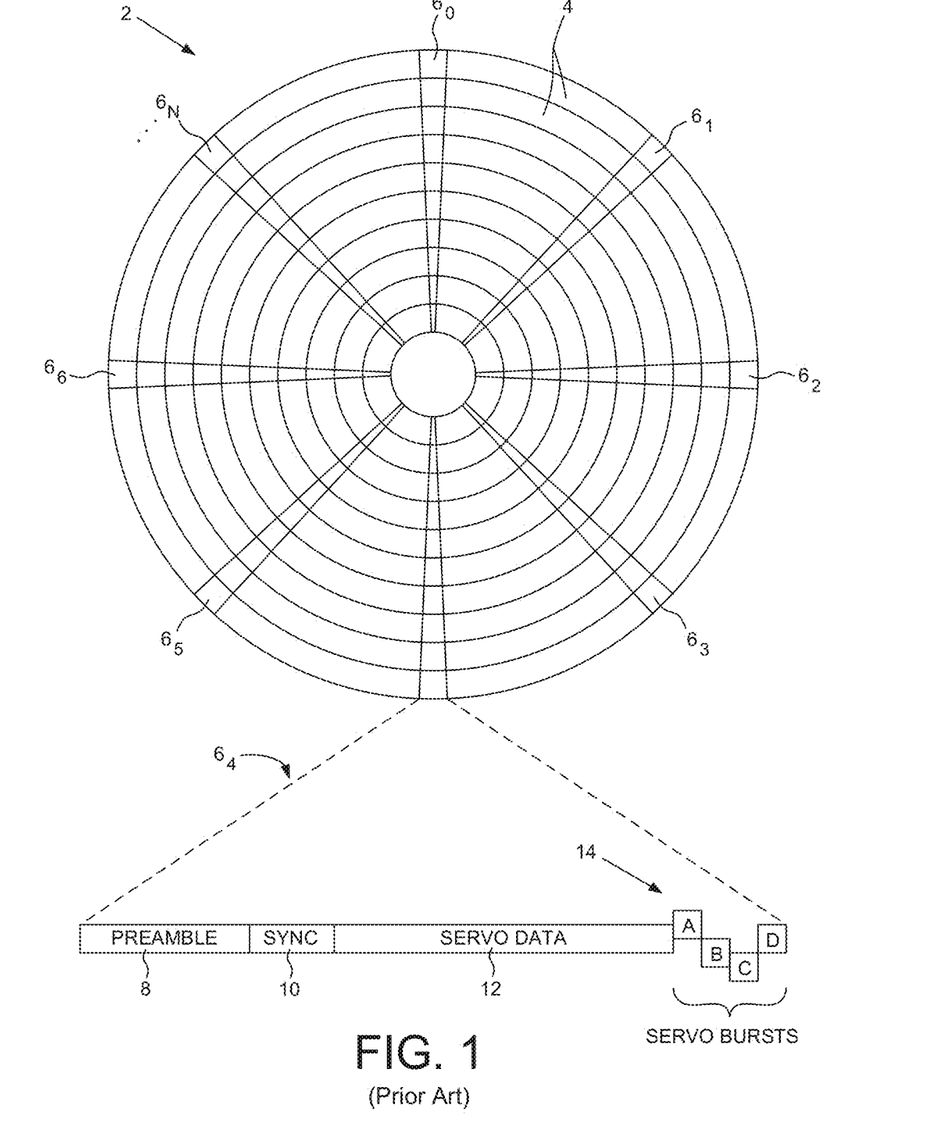
FIG. 1 shows a prior art disk format having a plurality of servo tracks defined by embedded servo sectors.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector 6, comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

In the related art, there are free fall sensors (FFS) that are operable to detect a free fall event in response to an acceleration occurring in the disk drive due to the disk drive undergoing a free fall. The disk drive may undergo a free fall, for example, when a user drops the device containing the disk drive. During the free fall, a frequency response of the acceleration signal can be measured, and action can be taken depending on the frequency response. When a free fall is detected, the head is moved off the disk and parked in the ramp to protect against damage.

As disk drives are implemented in smaller and more mobile devices, such as mobile phones and tablets, the possibility of false positives increases for free fall detection. Such mobile devices may be used more vigorously in gaming, exercise or running situations, in comparison to laptops and desktops. If the head is parked during such situations, then the device may be inadvertently disabled by a false trigger of the free fall detection system, even though the mobile device is not in free fall and is being used legitimately. The quality of the free fall detection therefore needs modification to provide timely triggers to initiate the head parking and to reduce the trigger based on false positives (e.g., gaming motion, walking motion, etc.).

DETAILED DESCRIPTION OF EXAMPLE EMBODIMENTS

Some example embodiments described herein involve apparatuses and methods for a new free fall detection scheme to be used in an acceleration sensor or accelerometer equipped (e.g., three axis accelerometer, gyroscope, etc.) disk drive that is embedded in a mobile device, such as a tablet or mobile phone. In contrast to the related art, example embodiments involve a multi-mode detection scheme that includes free fall, tilt drop, and gaming mode detection to distinguish the different types of motion that could occur in a mobile device environment. In this manner, minor falls or tilts (e.g. <1-2 cm) and movement related to legitimate use (e.g., running, gaming, etc.) can be handled without triggering a false positive.

In the free fall mode detection, the mobile device can be configured to detect and confirm weightless free falls. Weightless free falls are a common and dangerous type of fall. To detect and confirm a weightless free fall, an accelerometer that measures at least three degrees of freedom can be utilized, such that magnitude of the acceleration outputs drop to 0 and stay near 0 during the falls. Such free falls can happen at any time during the usage of the device.

In the tilt drop mode detection, sensor outputs may vary at different sensor locations, supporting edges, tilt angles, and so on. One example of a tilt drop motion is when the mobile device is initially positioned at a tilted upright angle and then falls off from the position toward the table surface. The mobile device may fall around a supporting edge, wherein free-fall like fast motions may be unlikely before the tilt drop. During a tilt drop or a free fall, the control circuitry can be configured to park the head before the impact to the device occurs.

In the gaming mode detection, the mobile device can be configured to detect gaming mode motions, which can involve motions where the user is using the mobile device in a physical activity, such as playing a mobile game, jogging, etc. The three modes of detection can be based on thresholds of the magnitudes of the acceleration outputs, as described with respect to FIG. 3B.

Figure 2A:
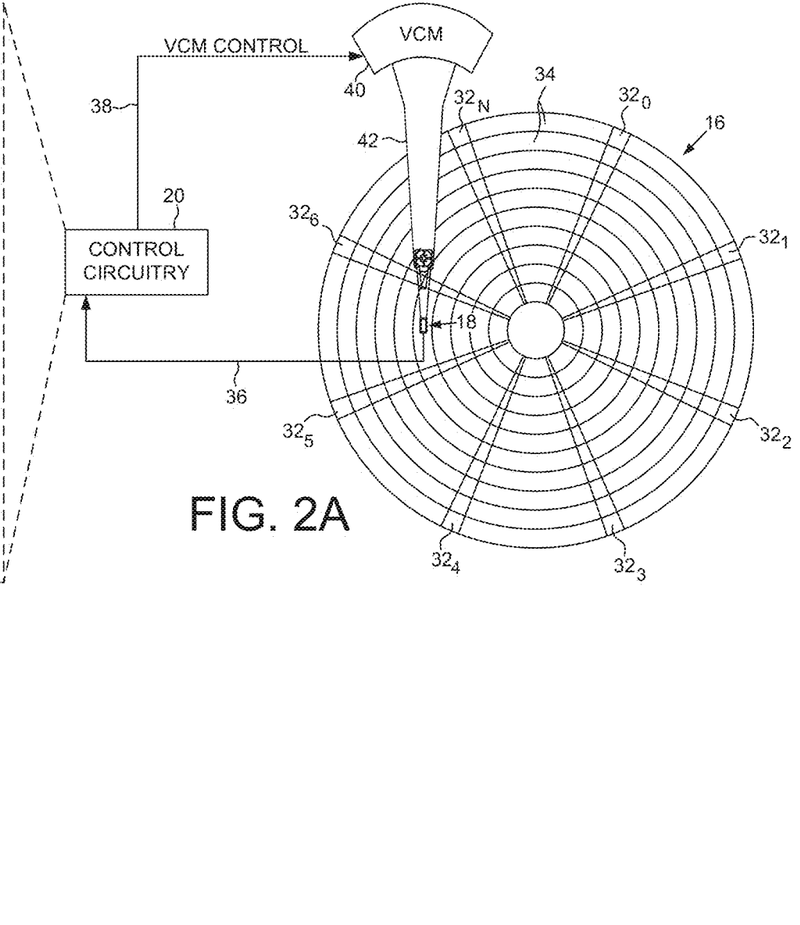
FIG. 2A shows a disk drive according to an example embodiment of the present inventive concept, having a head actuated over a disk by a servo control system.
Figure 2B:
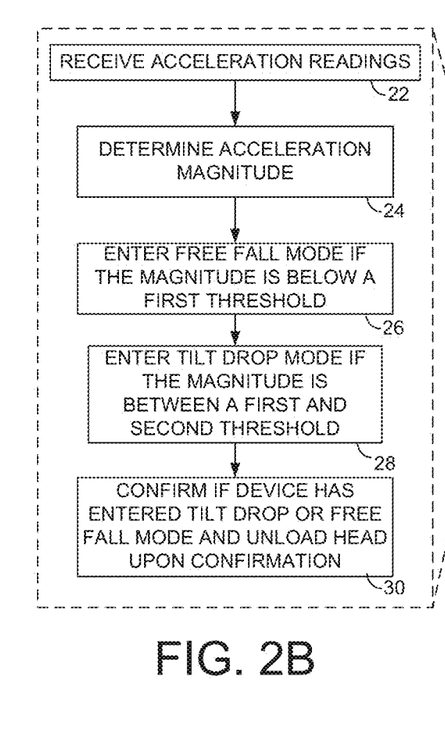
FIG. 2B is a flow diagram according to an example embodiment of the present inventive concept, wherein the control circuitry may actuate the head to park when a free fall or tilt drop is detected.

FIG. 2A shows a disk drive according to an example embodiment of the present inventive concept, having a disk 16, a head 18, and control circuitry 20 including a servo control system operable to actuate the head 18 over the disk 16. The disk 16 includes embedded servo sectors $32_0$-$32_N$ that define a plurality of servo tracks 34. The control circuitry 20 executes the flow diagram of FIG. 2B. The operations in FIG. 2B may be implemented, for example, in the hard drive firmware. When the hard disk drive is in operation, the head is flying over the disk. Acceleration readings from one or more sensors are provided to the control circuitry (22). The control circuitry can then determine the magnitude of the acceleration based on the acceleration readings (24). If a first threshold is crossed, the control circuitry may configure the disk drive to enter free fall mode (26). If the magnitude of the acceleration did not cross the first threshold, and is in between the first threshold and a second threshold, then the control circuitry may configure the disk drive to enter tilt drop mode (28). The control circuitry may be configured to confirm if the device has entered the tilt drop or the free fall mode, and park the head upon confirming the mode (30).

In the example embodiment of FIG. 2A, the disk 16 comprises embedded servo sectors $32_0$-$32_N$ that define a plurality of servo tracks 34. The control circuitry 20 processes read signals 36 from the head 18 for feedback in controlling the head while implementing the flow diagram of FIG. 2B. The control circuitry 20 generates a control signal 38 applied to a voice coil motor (VCM) 40 which rotates an actuator arm 42 about a pivot in order to actuate the head 18 to load the head to fly over the disk and to unload the head and park the head on a ramp.

Terms such as "first", "second", "third", etc. are used for labeling purposes and are not meant to be limiting to any particular order. For example, in another example implementation by the control circuitry 20, the control circuitry can utilize an additional warning mode before entering the free fall mode 26 when the magnitude of acceleration readings are beyond a first threshold. This first threshold can be configured depending on the desired implementation of the device to account for variance of measurements from the sensors. When this threshold is exceeded, then the control circuitry may proceed to entering the free fall mode 26 if the magnitude readings are below a second threshold. Additionally, a gaming mode may be initiated if the magnitude does not exceed the tilt drop mode or free fall mode thresholds, as described in further detail below.

Figure 3A:
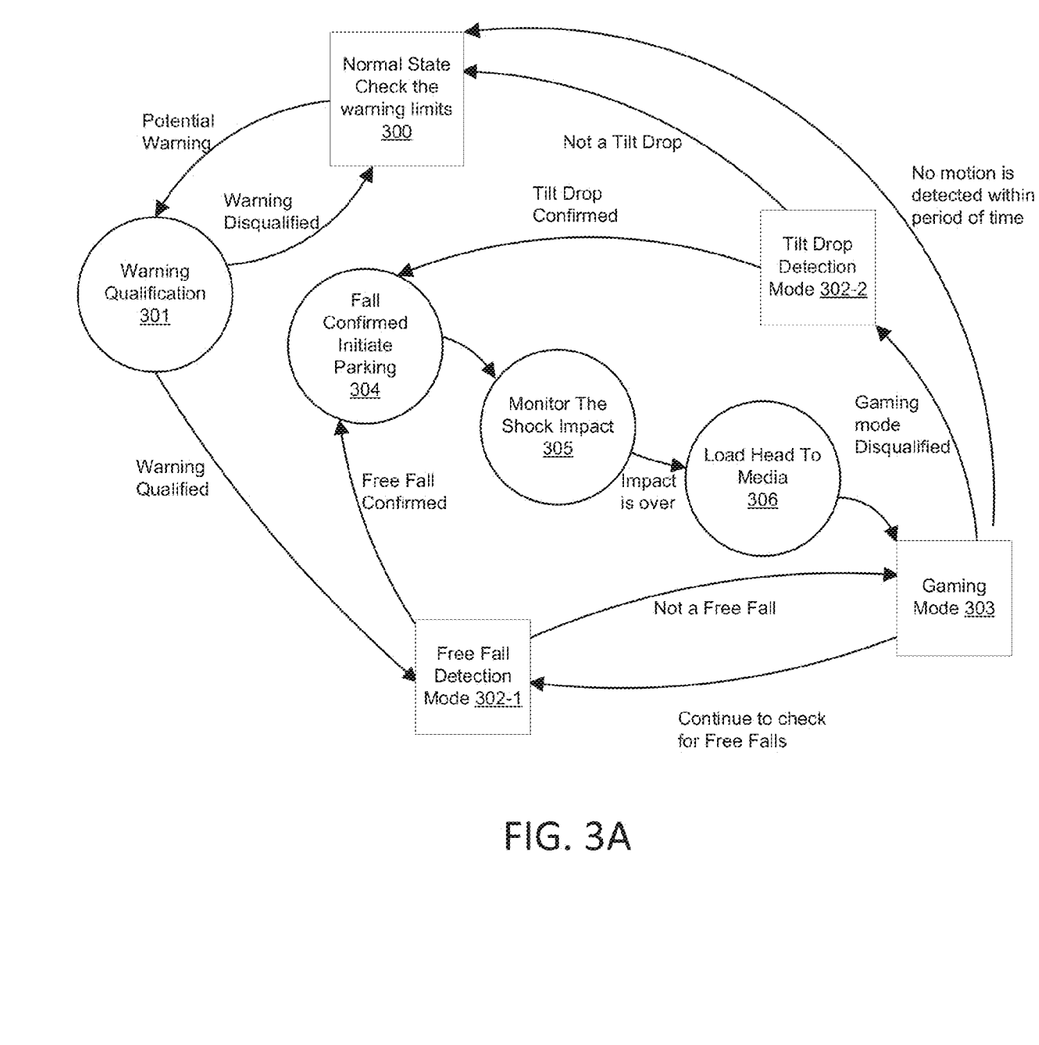
FIG. 3A illustrates a state diagram in accordance with an example embodiment.

FIG. 3A illustrates a state diagram in accordance with an example embodiment. In a first normal state (300), the control circuitry is configured to allow the disk drive to operate normally while monitoring the acceleration from the sensors of the device. When the acceleration magnitude exceeds a warning threshold or changes from a nominal state, then the state can proceed to a warning qualification state (301) to determine if further detection is needed. If no further detection is needed, then the warning is disqualified, wherein the state can revert back to the normal state. The warning qualification state can determine if further detection is needed based on various attributes (e.g., time elapsed for the acceleration readings), depending on the desired implementation.

If further detection is needed, then the warning is qualified and the control circuitry can proceed to the free fall detection mode (302-1) to check for a free fall. The check for a free fall can be conducted based on one or more attributes, such as the magnitude of the outputs of the acceleration sensors with respect to a threshold. If a free fall is detected and confirmed over a period of time, then the control circuitry can configure the disk drive to park the head (304). If no free fall is detected or confirmed, the control circuitry can enter a gaming mode (303) wherein the control circuitry checks for tilt drop and free fall while permitting the device to perform normally. If no motion is detected after a period of time (e.g., 0.5 seconds or in accordance with a desired implementation) during the gaming mode, then the control circuitry can revert back to the normal state (300).

During the gaming mode (303), the magnitude of the acceleration sensor outputs are monitored to check for free falls (302-1) or enter a tilt drop mode (302-2) if excessive motion is detected. The tilt drop detection can be based on one or more attributes, such as the magnitude of the outputs of the acceleration sensors with respect to another threshold, or if the integration based on the difference between the magnitude and 1 g is positive, as described below. Tilt drop can be detected, for example, if the magnitude exceeds the threshold for the gaming mode and doesn't exceed the threshold for free fall detection, or if the integration based on the difference between the magnitude and 1 g is positive, as described below. If a tilt drop is detected, the control circuitry can be configured to park the head (304). Otherwise, the control circuitry can be configured to revert back to the normal state (300) or the gaming mode state (303), depending on the desired implementation.

When a tilt or free fall is detected and confirmed over a period of time (304), the control circuitry is configured to park the head and monitor the ensuing shock impact (305). The period of time can be chosen based on the configuration of the device and the desired implementation, and should be a time period that is sufficient for confirming a fall yet short enough to allow time for the head to park before an impact event. The impact will result in a frequency response by the outputs of the acceleration sensors, which will gradually dissipate to normal. When the impact is normal (e.g., the magnitude of the acceleration readings have reverted to 1 g), then the control circuitry loads the head back to the media (306), whereupon the control circuitry enters the gaming mode (303) before reverting to the normal mode (300).

Figure 3B:
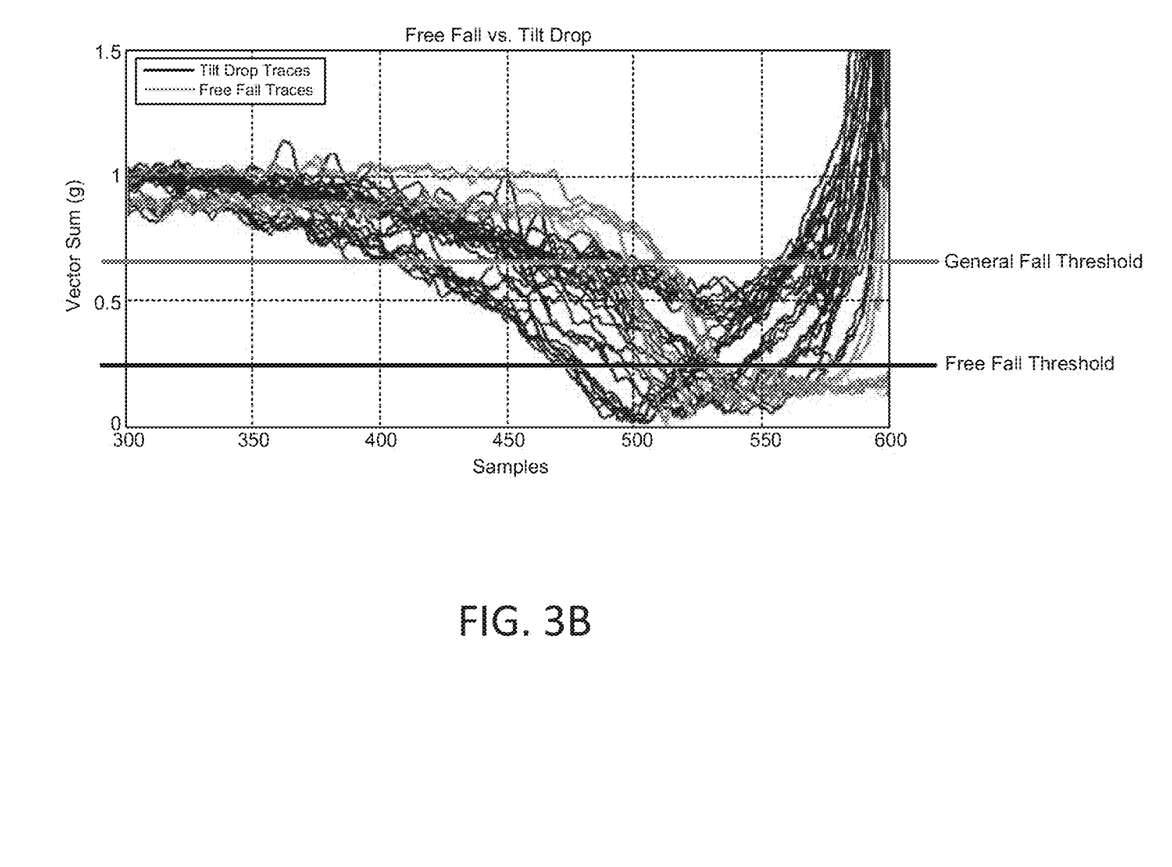
FIG. 3B illustrates an example of the magnitude measurements based on acceleration sensor output, in accordance with an example embodiment.

FIG. 3B illustrates an example of the magnitude measurements based on acceleration sensor output, in accordance with an example embodiment. The control circuitry may navigate the various states in the state diagram of FIG. 3A based on the magnitude measurements as illustrated in FIG. 3B. The thresholds can be based on the Vector Sum (VS) of the outputs of the acceleration sensors. VS represents the magnitude of the vector addition of X, Y, Z-axis accelerations and can be formulated, for example, as VS=sqrt (X^2±Y^2±Z^2). The slope of the output of the accelerations sensors can also be utilized instead of the magnitude, depending on the desired implementation; however, the characteristics of the tilt drop may be more difficult to characterize in a slope based implementation.

When the mobile device is not undergoing any particular motion, VS will be substantially close to 1 g with some degree of variance for measurement error or nominal movement. During a free fall or a tilt fall, VS will approach 0. During the gaming mode, where the user is conducting operational motions such as playing a game or running, the VS will move up and down around 1 g. VS based thresholds can be implemented regardless of the orientation of the mobile device.

Weightless free falls tend to have a stronger sensor signature compared to other general falls. The VS in a free fall drops to 0 rather quickly and stays near 0. Two different thresholds can be utilized in the FFS detection. For example, when VS<Free Fall Threshold, the free fall detection algorithm can be executed; when VS is between the Free Fall Threshold and the General Fall Threshold, the tilt drop detection algorithm can be executed.

In an example implementation, the control circuitry can enter the gaming mode when VS>1.15 g. The intensity of the gaming motion can be determined by integrating (VS^2−1)

after entering the gaming mode. The control circuitry can then maintain the gaming mode when the integration is >0.

Based on the design requirement and the acceleration sensor location, the FFS detection can be made more sensitive to detect the tilt drops. Without the history of the motion, it may be hard to distinguish tilt drops from normal user operational motions. Thus, integration saves the "motion history" to reduce the likelihood of false triggers.

Tilt drops tend to fall around a supporting edge and tend not to have large motions before the tilt drops. So when the mobile device is in the gaming mode, the tilt drop detection can be disabled, depending on the desired implementation. Further, because the tilt drops tend to fall around a supporting edge, sensor placement away from the supporting edge may aid in ensuring that the tilt drop can be detected. Free fall detection is not affected by the gaming mode.

The gaming mode can be exited if VS is, for example within a range of 0.72 g-1.2 g for 500 ms. Other ranges can be utilized depending on the desired implementation and the type of device. Thus, the gaming mode can significantly reduce false triggers, without sacrificing the protection for real free falls.

FIGS. 4A to 4D illustrate example state changes based on acceleration readings, in accordance with an example embodiment. With reference to FIG. 3A for the state graphs of FIGS. 4A to 4D, the zero state represents the normal state 300, the first state represents the warning qualification state 301, the second state represents either the free fall detection mode 302-1 or the tilt drop detection mode 302-2, the third state represents the gaming mode 303, the fourth state represents the parking of the head 304, the fifth state represents the head remaining parked while monitoring the shock impact 305, and the sixth state represents the loading of the head back to the media 306.

The integration graphs of FIGS. 4A to 4D are based on the difference between the acceleration magnitude and 1 g and the integration values are used to indicate the motion history of the device to prevent false triggers. For example, integration can be measured as integration=integration+(VS^2−1) or some variation thereof depending on the desired implementation. FIGS. 4A to 4D illustrate example implementations of the integration measurements depending on the situation. The integration may start to decrease sharply during a fall and may increase when the acceleration magnitude exceeds a threshold (e.g., when the user is moving the device while conducting some activity).

Figure 4A:
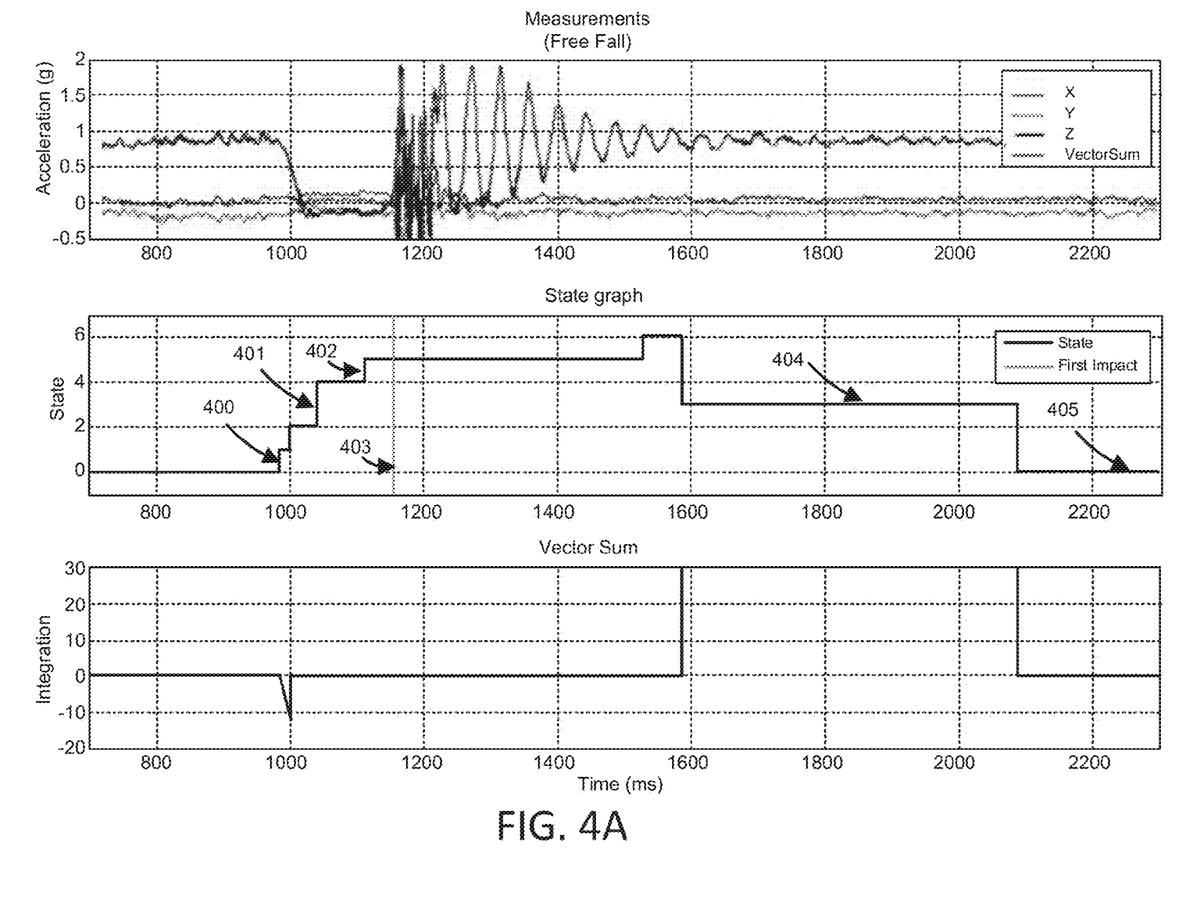
FIGS. 4A to 4D illustrate example state changes based on acceleration readings, in accordance with an example embodiment.

FIG. 4A illustrates the flow of the state changes based on the acceleration magnitude for a free fall. As illustrated in FIG. 4A, during the free fall of the mobile device, the magnitude of the accelerometer readings quickly go to zero. From the acceleration readings, the control circuitry can enter into the warning qualification state 301 at 400 to determine if the device is entering a free fall mode, a tilt drop mode or a gaming mode. In the example of FIG. 4A, the control circuitry determines that the device is in free fall mode after a 15 ms qualifier, so the free fall detection mode 302-1 is entered at 401 to detect a free fall. After confirmation that the device is in free fall by observing the acceleration magnitude over a 40 ms time interval, the head is then parked 304 at 402 before the impact event. The parking may take up to 70 ms to conduct, so the confirmation timing of the fall detection may be adjusted depending on the device and the desired implementation to ensure that the head is parked before an impact occurs. Upon impact to the device as shown at 403, the head remains parked and the acceleration magnitude is observed 305 until the acceleration magnitude stabilizes back towards 1 g. When the magnitude stabilizes, the head can be unloaded 306 and the device can enter gaming mode 303 for some time as shown at 404, whereupon the control circuitry can configure the device to revert back to normal mode 300 as shown at 405.

Figure 4B:
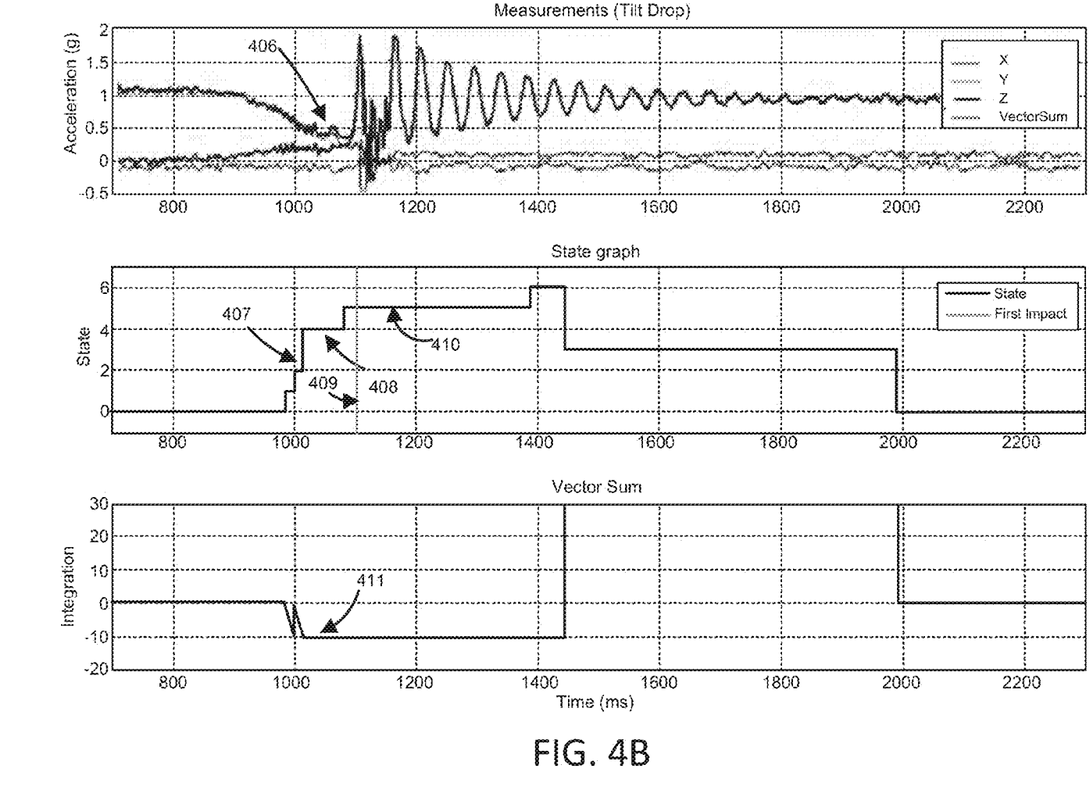

FIG. 4B illustrates the flow of the state changes for detecting tilt drops, in accordance with an example embodiment. As illustrated in FIG. 4B, the magnitude of the sensor output may not necessarily go to zero in a tilt drop as shown at 406. In the example as illustrated in FIG. 4B, when VS<0 the integration can be measured as integration=integration+(max(VS,0.5 g))^2−1. In this example implementation, if the integration is roughly −10 as shown at 411, then the control circuitry enters the tilt drop detection mode 302-2. Once the tilt drop is confirmed over a period of time (e.g., 15 ms) at 407, the control circuitry parks the head 304, which can take up to 70 ms as shown a 408. The head remains parked as shown at 410 during the impact 409 until the oscillation of the magnitude begins to stabilize. Once the oscillation stabilizes, the control circuitry enters the gaming mode 303, whereupon the control circuitry can subsequently enter the normal state 300 afterwards.

Figure 4C:
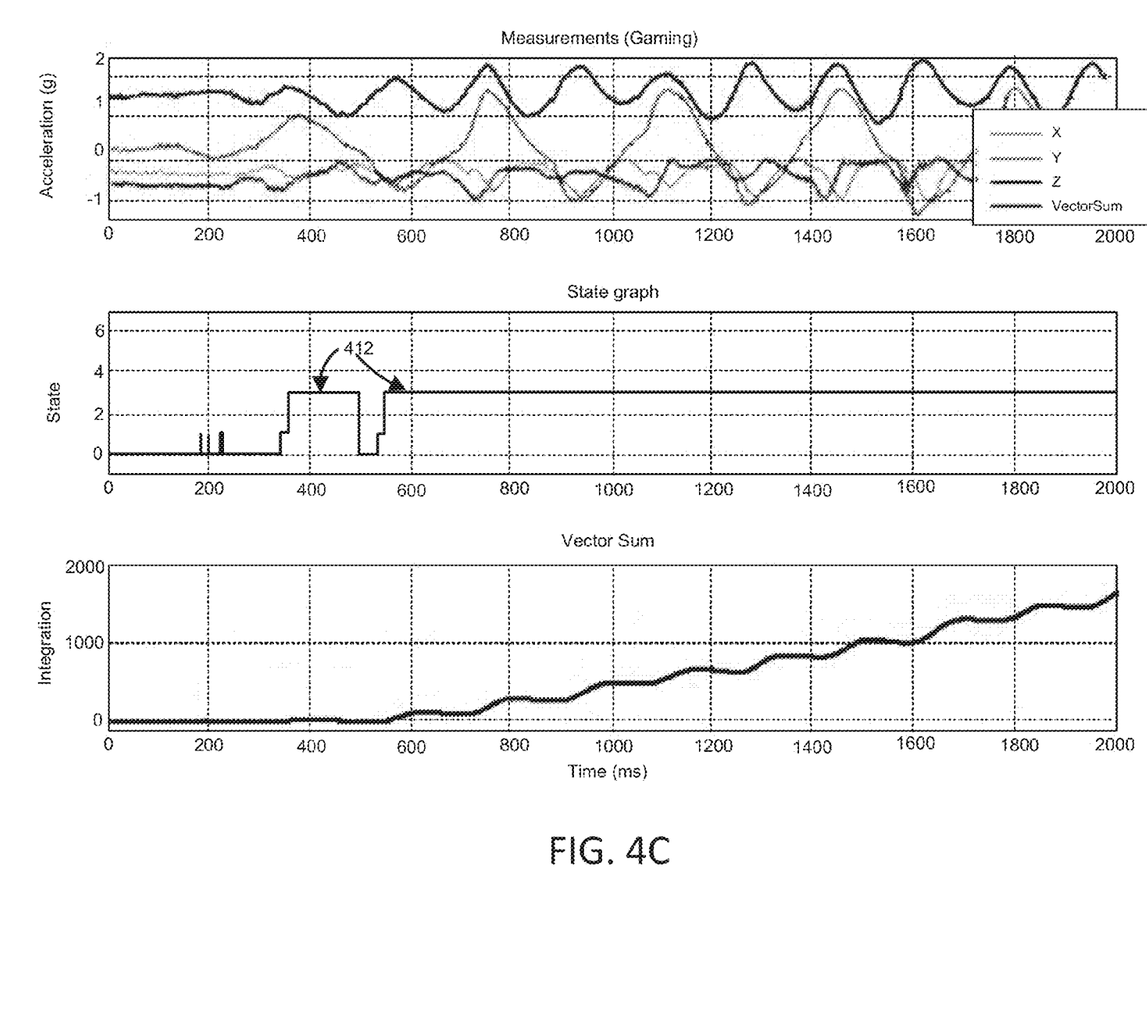

FIG. 4C illustrates the flow of the state changes for detecting the gaming mode, in accordance with an example embodiment. The gaming mode 303 can be used to reduce false triggers for the fall detection. As illustrated in FIG. 4C, the magnitude oscillates around the 1 g mark. In the example implementation shown in FIG. 4C, the threshold is set at 1.2 g, so that if VS>1.2 g, then integration=integration+(VS^2−1)*2, otherwise, integration=integration+(VS^2−1). When the integration is greater than zero as illustrated in the integration graph, then the control circuitry enters the gaming mode 303 as shown at 412.

Figure 4D:
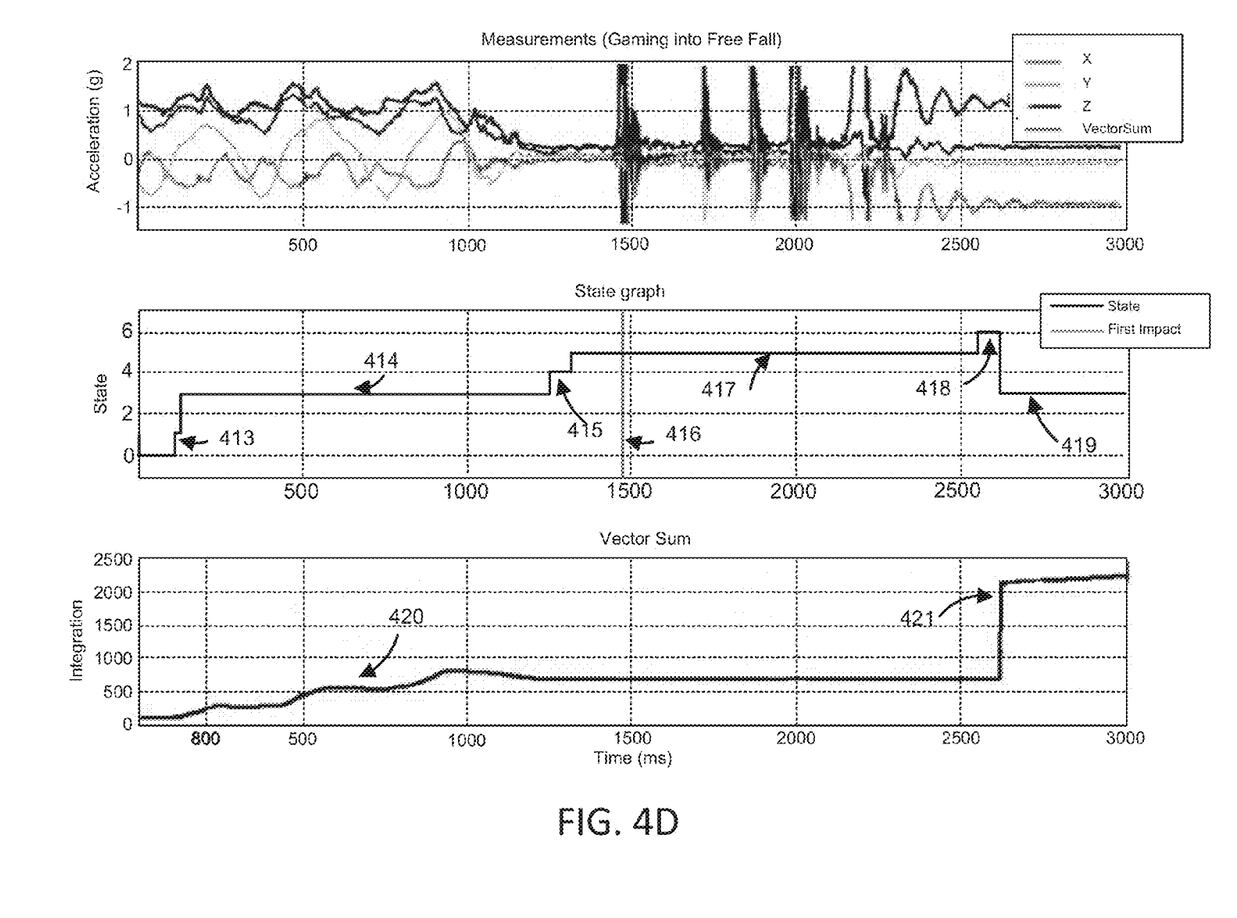

FIG. 4D illustrates the flow of the state changes for a free fall detection while gaming motions are occurring, in accordance with an example embodiment. When movement beyond a nominal threshold is detected, the control circuitry enters the warning qualification state 301 at 413. Because the integration is greater than zero as shown at 420, the control circuitry enters the gaming mode 303 after a confirmation (e.g. 15 ms) as shown at 414. During the gaming mode, the magnitude oscillates around 1 g. In the example of FIG. 4D, the user drops the device during use, which causes the magnitude to sharply decrease to zero. As the magnitude decreases towards zero, the control circuitry detects and confirms the free fall 302-1 at 415, and parks the head before the impact at 416. Upon impact to the device, the head remains parked and acceleration magnitude is observed 305 as shown at 417 until the acceleration magnitude stabilizes back towards 1 g. When the magnitude stabilizes, the head can be unloaded 306 as shown at 418 and the device can enter gaming mode 303 for some time as shown at 419, whereupon the control circuitry can configure the device to revert back to normal mode 300. The time period that the device enters the gaming mode 303 after the head is loaded 305 can be set by initializing the integration to a positive value. In the example of FIG. 4D, the integration is initialized to 2000 after the head is loaded as shown at 421.

Figure 5:
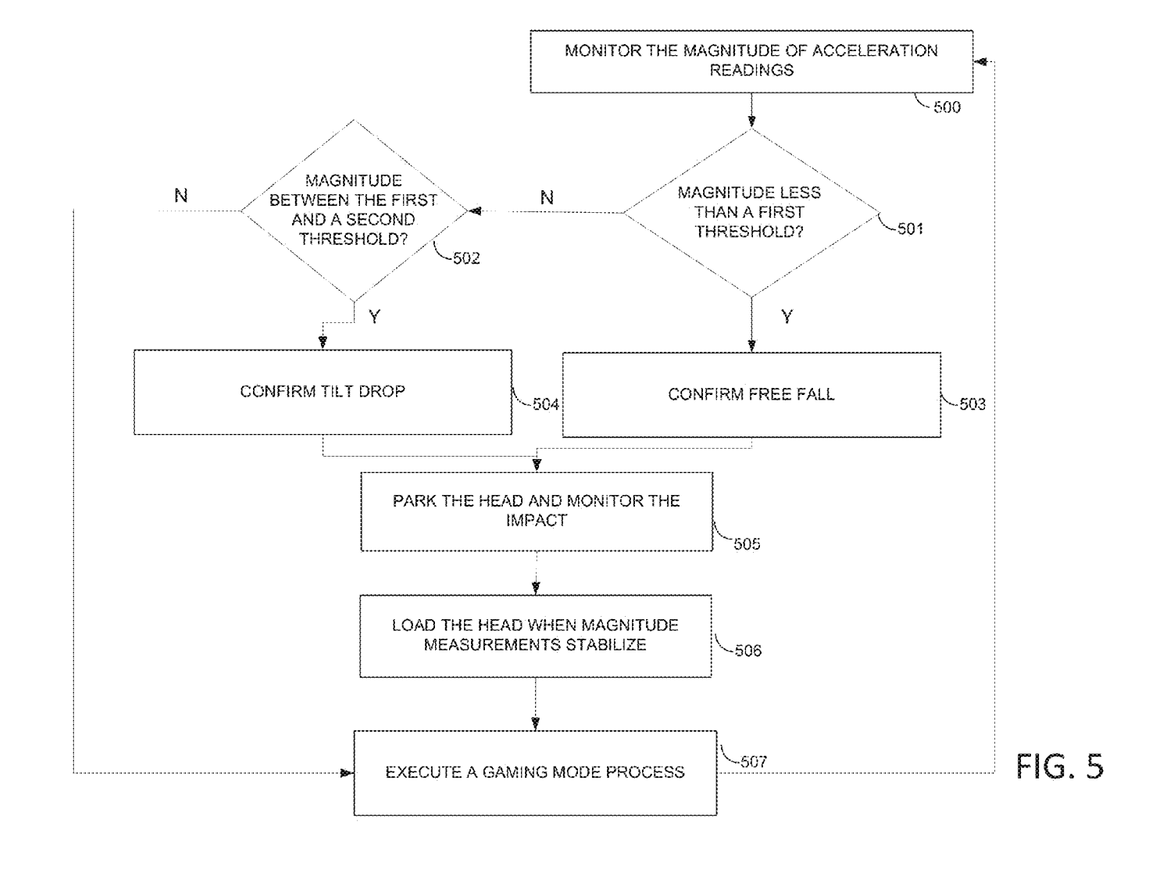
FIG. 5 illustrates a flow diagram of an example embodiment of the present inventive concept.

FIG. 5 illustrates a flow diagram of an example embodiment of the present inventive concept. The flow begins at 500, wherein the magnitude of the acceleration readings may be monitored. The magnitude may be a vector sum of all of the acceleration readings. The magnitude is continuously measured until the measurements exceed a warning threshold, whereupon the flow continues to 501. At 501, a check is performed to determine if the magnitude is less than a first threshold. If so (Y), then the flow proceeds to 503 to confirm that the device is in free fall over a period of time and determine from the confirmation whether to park the head at 505 or to revert back to monitoring at 500.

Otherwise (N), the flow proceeds to 502, wherein a check is performed to determine if the magnitude is between the first threshold and a second threshold. If so (Y), then the flow proceeds to confirm that the device is undergoing a tilt drop over a period of time determine from the confirmation whether to park the head at 505 or to revert back to monitoring at 500. The confirmation can also involve checking the integration to determine whether the integration is negative. If the magnitude is not between the first and second threshold (N) and motion is detected, then the flow may execute a gaming mode process 507 during which the flow reverts back to 500 to monitor the magnitude of the acceleration readings. During the gaming mode process, the flow at 502 may be disabled while there is motion occurring at the device so that only free fall detection is executed, as explained in FIGS. 3A and 4C. The flow at 502 may be re-executed when the motion returns back to nominal readings (e.g. around 1 g) or after a period of time elapses (e.g., 500 ms).

When a tilt drop or a free fall is detected, the flow proceeds to 505 to park the head and monitor the impact. When the impact occurs, the frequency response of the magnitude may be measured. When the magnitude measurements stabilize (e.g., return to within a range of 1 g), the flow proceeds to load the head at 506, and execute a gaming mode process at 507.

Figure 6:
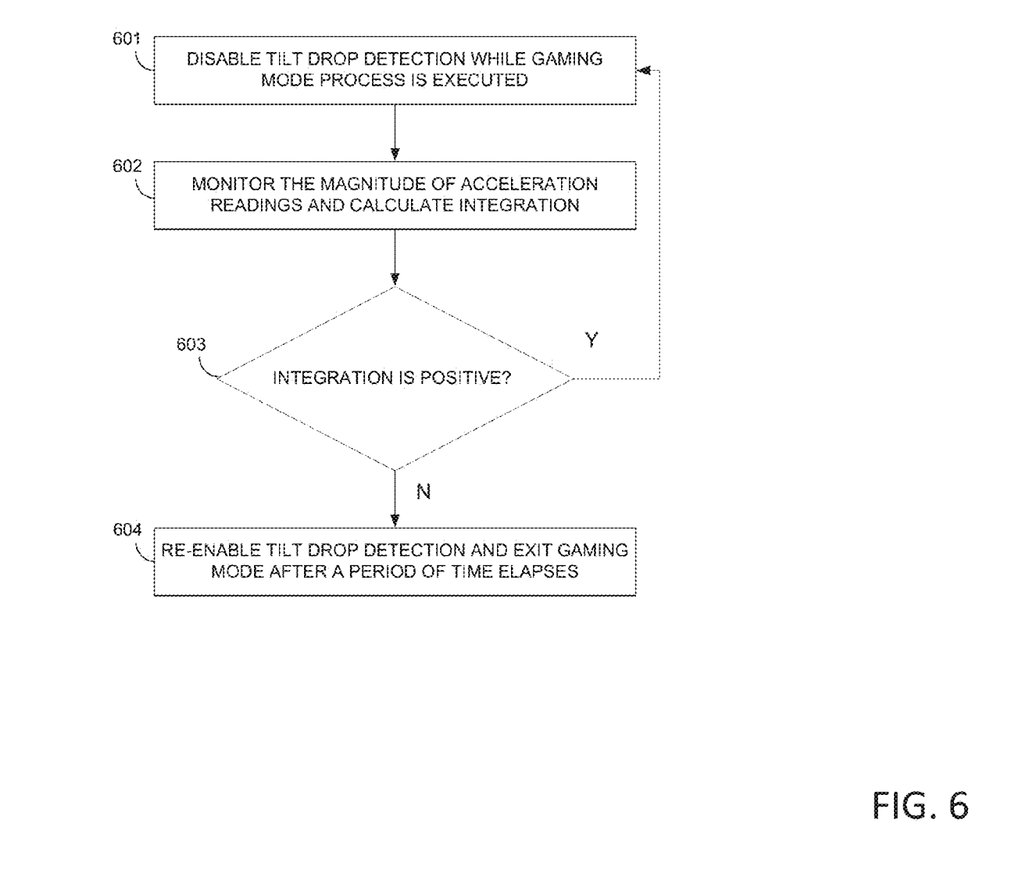
FIG. 6 illustrates a flow diagram of a gaming mode process in accordance with an example embodiment.

FIG. 6 illustrates a flow diagram of a gaming mode process 507 in accordance with an example embodiment. At 601, when the gaming mode process is executed, the tilt drop detection is disabled. At 602, the magnitude of the acceleration readings is monitored and the integration is calculated. At 603, if the integration is positive (Y) then the gaming mode is maintained and the flow proceeds to 601 to keep the tilt drop detection disabled. If the integration is not positive (N) then the flow proceeds to 604 to re-enable the tilt drop detection and exit the gaming mode process after a period of time elapses. The period of time can be set depending on the desired implementation (e.g., based on the device configuration, preset at 500 ms, etc.)

Any suitable control circuitry may be employed to implement the flow diagrams in the example embodiments of the present invention, such as any suitable integrated circuit or circuits. For example, the control circuitry may be implemented within a read channel integrated circuit, or in a component separate from the read channel, such as a disk controller, or certain actions described above may be performed by a read channel and others by a disk controller. In one example embodiment, the read channel and disk controller are implemented as separate integrated circuits, and in an alternative example embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one example embodiment, the control circuitry comprises a microprocessor executing instructions, the instructions being operable to cause the microprocessor to perform the actions of the flow diagrams described herein. In some embodiments, certain actions may be omitted, combined, and/or performed in a different order than shown here. The instructions may be stored in any computer-readable medium. In one example embodiment, they may be stored on a non-volatile semiconductor memory external to the microprocessor, or integrated with the microprocessor in a SOC. In another example embodiment, the instructions are stored on the disk media and read into a volatile semiconductor memory when the disk drive is powered on. In yet another example embodiment, the control circuitry comprises suitable logic circuitry, such as state machine circuitry.

One example embodiment involves a disk drive comprising: a disk; a head; and control circuitry comprising a servo control system operable to actuate the head, the control circuitry configured to: determine a magnitude of acceleration readings, the acceleration readings involving at least three degrees of freedom, wherein when a magnitude of the acceleration readings is less than a first threshold, the control circuitry detects and confirms a free fall, wherein when the magnitude is between the first and second threshold, the control circuitry detects and confirms a tilt drop. During the tilt drop and the free fall, the control circuitry is further configured to actuate the head to park and monitor the shock impact. When the impact is over (e.g., based on the stabilization of the magnitude, such as the magnitude being within a range of 1 g), the control circuitry is further configured to load the head to media and proceed to a gaming mode. The control circuitry is configured to remain in the gaming mode until a period of time elapses.

Another example embodiment involves a control circuitry configured to: determine a magnitude of acceleration readings, the acceleration readings involving at least three degrees of freedom, wherein when a magnitude of the acceleration readings is less than a first threshold, the control circuitry detects and confirms a free fall, wherein when the magnitude is between the first and second threshold, the control circuitry detects and confirms a tilt drop. During the tilt drop and the free fall, the control circuitry is further configured to actuate the head of a disk drive to park and monitor the shock impact. When the impact is over (e.g., based on the stabilization of the magnitude, such as the magnitude being within a range of 1 g), the control circuitry is further configured to load the head to media and proceed to a gaming mode. The control circuitry is configured to remain in the gaming mode until a period of time elapses.

Another example embodiment involves a device, comprising: a disk; a head; one or more acceleration sensors, and control circuitry comprising a servo control system operable to actuate the head, the control circuitry configured to: determine a magnitude of acceleration readings from the one or more acceleration sensors, the acceleration readings involving at least three degrees of freedom, wherein when a magnitude of the acceleration readings is less than a first threshold, the control circuitry detects and confirms a free fall, wherein when the magnitude is between the first and second threshold, the control circuitry detects and confirms a tilt drop. During the tilt drop and the free fall, the control circuitry is further configured to actuate the head to park and monitor the shock impact. When the impact is over (e.g., based on the stabilization of the magnitude, such as the magnitude being within a range of 1 g), the control circuitry is further configured to load the head to media and proceed to a gaming mode. The control circuitry is configured to remain in the gaming mode until a period of time elapses. The one or more acceleration sensors may be positioned away from a tilt edge of the device at a distance towards the center of the device such that the one or more acceleration sensors record measurements from all of the at least three degrees of freedom when the device undergoes a tilt drop from the tilt edge. The device may involve a mobile device, such as a tablet or a mobile phone, or may also be a laptop.

Another example embodiment involves a method, comprising: determining a magnitude of acceleration readings, the acceleration readings involving at least three degrees of freedom, wherein when a magnitude of the acceleration readings is less than a first threshold, detecting and confirming a free fall, wherein when the magnitude is between the first threshold and a second threshold, detecting and confirming a tilt drop. During the tilt drop and the free fall, the method further includes actuating the head of the disk drive to park and monitoring the shock impact. When the impact is over (e.g., based on the stabilization of the magnitude, such as the magnitude being within a range of 1 g), the method further includes loading the head to media and remaining in a gaming mode until a period of time elapses.

What is claimed is:

1. A disk drive comprising:
    a disk;
    a head; and
    control circuitry comprising a servo control system operable to actuate the head over the disk, the control circuitry configured to:
    determine a magnitude of acceleration readings, the acceleration readings involving at least three degrees of freedom,
    confirm a free fall when a magnitude of the acceleration readings is less than a first threshold, and
    confirm a tilt drop when the magnitude is between the first and a second threshold.

2. The disk drive of claim 1, wherein the control circuitry is further configured to actuate the head to park on a ramp of the disk drive, and monitor a shock impact when the control circuitry confirms the free fall or the tilt drop.

3. The disk drive of claim 2, wherein the control circuitry is further configured to:
    monitor the shock impact until the magnitude is within a range of 1 g, and
    when the magnitude is within the range, disable detection of the tilt drop for a preset period of time and unload the head from the ramp.

4. The disk drive of claim 1, wherein the control circuitry is further configured to disable detection of the tilt drop when an integration based on a difference between the magnitude and 1 g is positive.

5. The disk drive of claim 4, wherein the control circuitry is further configured to re-enable detection of the tilt drop when the magnitude is within a range of 1 g for another preset period of time.

6. The disk drive of claim 1, wherein the acceleration readings comprise readings along an X, Y and Z axis.

7. A control circuitry comprising:
    a servo control system operable to actuate a head over a disk; and
    one or more integrated circuits configured to:
    determine a magnitude of acceleration readings for a disk drive, the acceleration readings involving at least three degrees of freedom,
    confirm a free fall when a magnitude of the acceleration readings is less than a first threshold, and
    confirm a tilt drop when the magnitude is between the first and a second threshold.

8. The control circuitry of claim 7, wherein the one or more integrated circuits are further configured to actuate the head of the disk drive to park on a ramp, and monitor a shock impact when the control circuitry confirms the free fall or the tilt drop.

9. The control circuitry of claim 8, wherein the one or more integrated circuits are further configured to:
    monitor the shock impact until the magnitude is within a range of 1 g, and
    when the magnitude is within the range, disable detection of the tilt drop for a preset period of time and unload the head from the ramp.

10. The control circuitry of claim 7, wherein the one or more integrated circuits are further configured to disable detection of the tilt drop when an integration based on a difference between the magnitude and 1 g is positive.

11. The control circuitry of claim 10, wherein the one or more integrated circuits are further configured to re-enable detection of the tilt drop when the magnitude is within a range of 1 g for another preset period of time.

12. The control circuitry of claim 7, wherein the acceleration readings comprise readings along an X, Y and Z axis of the disk drive.

13. A method comprising:
    determining a magnitude of acceleration readings for a disk drive, the acceleration readings involving at least three degrees of freedom,
    confirming a free fall when a magnitude of the acceleration readings is less than a first threshold, and
    confirming a tilt drop when the magnitude is between the first and a second threshold.

14. The method of claim 13, further comprising actuating a head of the disk drive to park on a ramp, and monitoring a shock impact when the free fall or the tilt drop is confirmed.

15. The method of claim 14, further comprising:
    monitoring the shock impact until the magnitude is within a range of 1 g, and
    when the magnitude is within the range, disabling detection of the tilt drop for a preset period of time and unloading the head from the ramp.

16. The method of claim 13, further comprising disabling detection of the tilt drop when an integration based on a difference between the magnitude and 1 g is positive.

17. The method of claim 16, further comprising re-enabling detection of the tilt drop when the magnitude is within a range of 1 g for another preset period of time.

18. The method of claim 13, wherein the acceleration readings comprise readings along an X, Y and Z axis of the disk drive.

* * * * *